PRINTING TELEGRAPH SYSTEMS

Filed June 20, 1961 2 Sheets-Sheet 1

Oct. 27, 1964 H. L. PAULDING ETAL 3,154,635

PRINTING TELEGRAPH SYSTEMS

Filed June 20, 1961 2 Sheets-Sheet 2

United States Patent Office 3,154,635
Patented Oct. 27, 1964

3,154,635
PRINTING TELEGRAPH SYSTEMS
Herbert L. Paulding, Port Washington, and Richard T. Yu, New York, N.Y., assignors to Dow Jones & Company, Inc., New York, N.Y., a corporation of Delaware
Filed June 20, 1961, Ser. No. 118,305
6 Claims. (Cl. 178—4.1)

This invention relates to printing telegraph systems and more particularly to receivers for such systems which are adapted to print messages in response to a series of electrical signals transmitted from a central station.

There has been developed a printing telegraph system, for the dissemination of news items or other information, which is extremely accurate and highly efficient in operation. One such system is disclosed, for example, in H. L. Paulding Patent 1,957,076, issued May 1, 1934. Systems of this type customarily include a transmitter located at the central station which sends out control signals of predetermined magnitude and duration over leased telephone lines or other transmission wires to one or more receivers, or "tickers," at locations remote from the transmitting station. At the receiver, certain of these signals are used to actuate a mechanism for selecting the particular characters to be printed, while others are effective to accomplish the actual printing and still others to perform various ancillary functions, such as turning the receiver on and off, repeating a given character, bell ringing, etc.

In such printing telegraph systems, it frequently is advantageous to operate the transmitter automatically through the use of a control tape, as disclosed, for example, in J. J. Ackell et al. Patents 2,017,087, issued October 15, 1935, and 2,531,868, issued November 28, 1950. With this arrangement, the various control signals are capable of being sent out over the transmission lines at a relatively high rate of speed. However, primarily because of the particular construction and arrangement of the receivers in systems of the type heretofore employed, it often was necessary to operate the transmitter at a speed below its maximum capability. In addition, in such previous systems, the signals necessary for the operation of the receivers in many instances have been of excessive amplitude; and this has been of special moment in cases where the signals are transmitted over telephone lines, with the resulting objectionable noises, etc., in the telephone circuits caused by the inductive effect of the relatively high amplitude signals.

One general object of this invention, therefore, is to provide a new and improved receiver for a printing telegraph system.

More specifically, it is an object of this invention to provide such a receiver which can be operated at a maximum rate.

Another object of this invention is to provide a receiver of the character indicated which is responsive to printing telegraph signals of reduced magnitude.

Still another object of the invention is to provide a printing telegraph receiver utilizing comparatively simple electrical and mechanical components, which receiver is economical to manufacture and thoroughly reliable in operation.

In one illustrative embodiment of this invention, the incoming signals from the transmitter, which include character selecting signals and printing signals, are translated at the receiver into other signals of uniform polarity. A character selecting mechanism is connected to the translating means and is responsive to the receipt of one or more character signals to select a particular character to be printed. The printing of the selected character is controlled by a printing mechanism which is maintained in operable relationship with the translating means by a circuit including a relay or other circuit controlling means. The arrangement of this circuit is such that the printing mechanism is rendered effective upon the receipt of a printing signal at the translating means to print the selected character.

In accordance with one feature of this invention, the translating means includes an electron discharge device, such as a transistor, for example, which is responsive to incoming current pulses or other signals of relatively low magnitude and is adapted to convert these signals into corresponding signals of a magnitude sufficient to control the various operations of the receiver. With this arrangement, the changes in amplitude of the incoming signals may be maintained well below the level at which they would adversely affect telephone conversations or other information transmitted over adjacent transmission lines.

In accordance with another feature of the invention, in a preferred embodiment, the circuit arrangement between the translating means and the printing mechanism is such that the relay in this circuit is operable in response to changes in the amplitude of the character signals to render the printing mechanism ineffective during the receipt of these signals. Upon receipt of the printing signals, however, the circuit enables operation of the printing mechanism in a rapid and straightforward manner to print the selected character.

In accordance with a further feature of the invention, in certain embodiments thereof, the character selecting mechanism is maintained in direct, electrically conductive relationship with the translating means. As a result, the rapid and accurate transmission of the converted signals to this mechanism is insured.

The present invention, as well as further objects and features thereof, will be understood more clearly and fully from the following detailed description of a preferred embodiment thereof, when read in conjunction with the accompanying drawings, in which.

Figure 1:
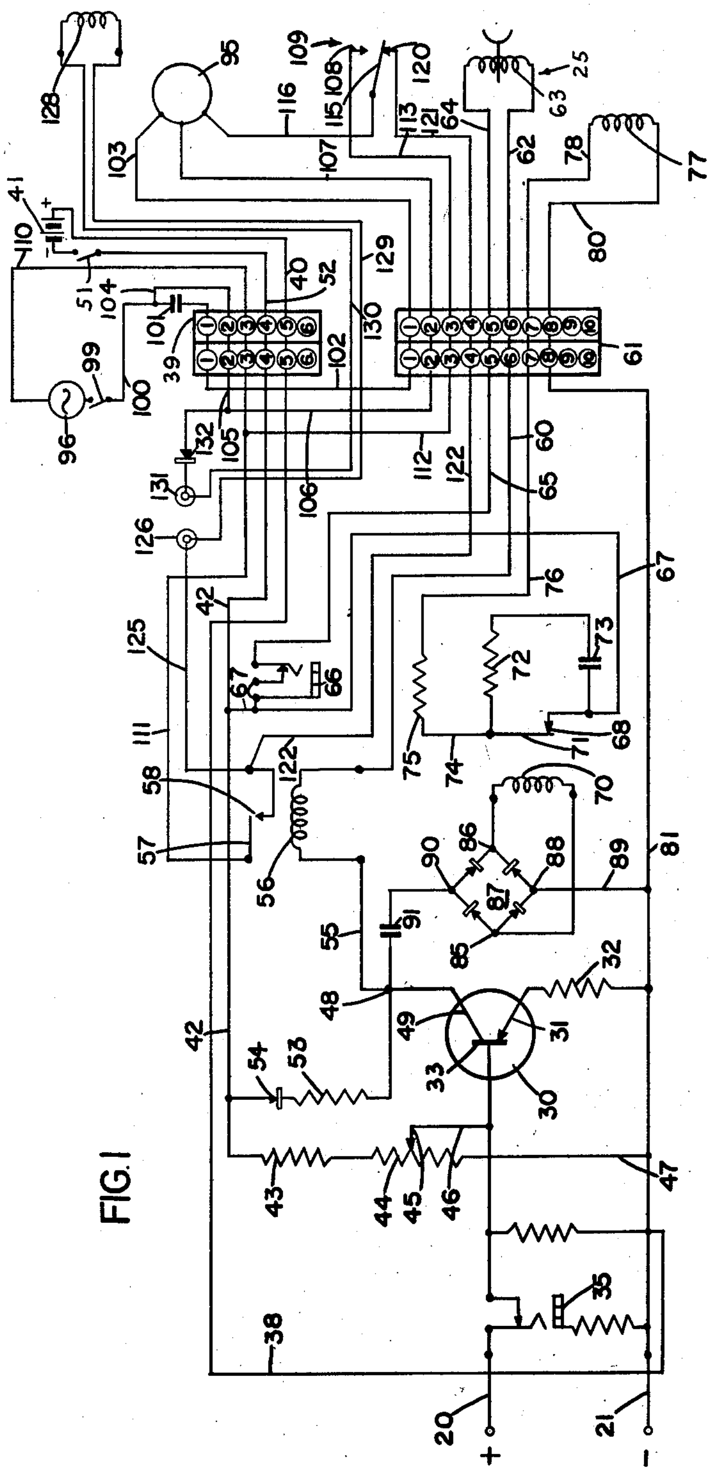
FIGURE 1 is a schematic circuit diagram of a preferred printing telegraph receiver constructed in accordance with the invention.

Referring initially to FIGURE 1 of the drawings, there is shown the circuitry of a printing telegraph receiver which is supplied with control signals over a pair of transmission lines 20 and 21. These transmission lines illustratively may comprise leased wires in cables which also carry telephone lines, or they may be separately maintained. The control signals are generated at a suitable transmitting station (not shown) and are transmitted to the receiver over the line 20 and return over the line 21.

Figure 2:
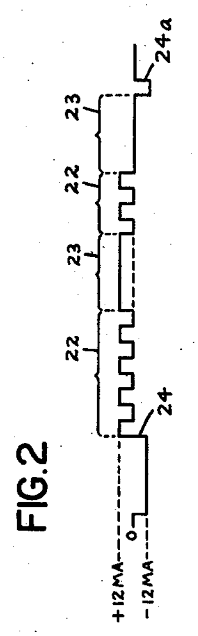
FIGURE 2 is illustrative of a typical current wave form supplied from a transmitter to the receiver of FIGURE 1.

As best shown in FIGURE 2, the control signals include character selecting signals 22 and printing signals 23. In the illustrated embodiment of the invention, the character signals 22 are in the form of relatively short, substantially square wave current pulses having an amplitude of plus twelve milliamperes, while the printing signals 23 comprise somewhat longer current pulses, or holds of either zero or plus twelve milliamperes. Certain additional signals 24 and 24*a* are used to control various other functions of the receiver, such as starting, bell ringing, repeating certain characters, etc., and comprise minus twelve milliampere current pulses of varying duration. The total current swing of the signals in the transmission lines 20 and 21 is thus twentyfour milliamperes, and any inductive pickup in the telephone lines is maintained at a minimum.

As will be more fully apparent from the description which follows, each character signal 22 is effective to initiate the operation of a selection escapement mechanism indicated generally at 25 (FIGURE 4) and thereby permit the rotation of a printing wheel 26 one step. Successive character signals continue to control the rotation of the wheel 26 until a particular character to be printed is oriented adjacent a sheet or strip of paper 27. A printing signal 23 is thereupon effective to enable the operation of an elongated platen 28, located on the side of the paper opposite that of the printing wheel, to push the paper against the wheel and thereby print the selected character. Thereafter, the wheel 26 is shifted axially in known manner, by means including the usual feed rack (not shown), to position the wheel opposite the next lateral space on the paper and to condition the receiver for the receipt of a succeeding group of character signals.

Connected across the transmission lines 20 and 21 is an electron discharge device, such as a p-n-p junction transistor 30. The transistor 30 is arranged in the common emitter configuration with its emitter 31 connected through a biasing resistor 32 to the transmission line 21 and its base 33 connected to the transmission line 20. If desired, a line testing jack 35 may be provided across the transmission lines, and a mating plug (not shown) may be inserted therein for testing the incoming pulses. The emitter 31 is supplied with positive voltage bias through the resistor 32, the line 21, a conductor 38, the terminals 5 of a Jones plug 39 and a conductor 40 connected to the positive terminal of a battery 41. The negative terminal of this battery is connected through a switch 51, a conductor 52, the terminals 4 of the plug 39, a conductor 42 and a resistor 43 to one terminal of a potentiometer 44, the center tap 45 of which is connected to a conductor 46 leading to the transmission line 20. The opposite terminal of the potentiometer 44 is connected through a conductor 47 to the line 21.

With this arrangement, the incoming control signals in the transmission lines 20 and 21 are translated into other signals which appear at an output terminal 48 connected to the collector 49 of the transistor 30. These latter signals conform timewise with the incoming signals but are inverted and amplified with respect thereto in a manner illustrated, for example, by the current wave form of FIGURE 3. Thus, the positively directed character signals 22 appear at the output terminal 48 as character signals 22' which comprise pulses going from positive current of increased but intermediate amplitude to zero current. The positive or zero printing signals 23 are translated into printing signals 23' of zero or increased, intermediate amplitude positive current, respectively, while the negatively directed signals 24 and **24*a* appear as positive signals 24' and 24*a*' of comparatively high amplitude. The setting of the potentiometer 44 is such that, in the absence of input current in the transmission lines 20 and 21, sufficient current flows from the emitter 31 of the transistor 30 to the base 33 to maintain an output current of intermediate amplitude at the terminal 48 which illustratively is of the order of plus one hundred and fifty milliamperes. Upon the receipt of a positive signal, such as one of the character signals 22 or a positive printing signal 23, for example, the emitter-to-base current of the transistor is driven below cut-off, and the flow of current at the terminal 48** is arrested. For negatively directed input signals, the emitter-to-base current increases to raise the current at the output terminal to a level substantially above its intermediate amplitude condition. The amplitude of this latter output current illustratively is three hundred milliamperes.

The output terminal 48 is connected through a resistor 53 to the cathode of a diode rectifier 54, the anode of which is connected to the conductor 42 leading to negative battery. The terminal 48 also is connected through a conductor 55 to one terminal of the winding of a time-delay relay 56. The relay 56 illustratively is of the copper-slug type and includes an armature 57 and a contact 58 which are open during normal operation of the receiver but are closed in response to the appearance of current of relatively high amplitude at the terminal 48 for a predetermined time interval, such as .50 second, for example, for purposes that will become more fully apparent hereafter. The opposite terminal of the relay winding is connected through a conductor 60, the terminals 6 of a Jones plug 61 and a conductor 62 to one side of an escapement winding 63 in the selection escapement mechanism 25. The circuit may then be traced from the opposite side of the solenoid 63, through a conductor 64, the terminals 5 of the Jones plug 61, a conductor 65 and a test jack 66 to a conductor 67, one end of which leads to the negative conductor 42.

The opposite end of the conductor 67 is connected to the contact 68 of a normally closed relay 70. This relay includes an armature 71 which is spring biased into engagement with the contact 68 and is connected thereto through a contact protection network comprising a resistor 72 and a series connected condenser 73. The armature 71 is connected through a conductor 74, a resistor 75 and a conductor 76 to the terminals 7 of the Jones plug 61 and from these terminals to one side of a printing solenoid 77 by a conductor 78. The opposite side of the solenoid 77 is connected to the positive terminal of the battery 41 through a conductor 80, the terminals 8 of the Jones plug 61, a conductor 81 leading to the transmission line 21, the conductor 38, the terminals 5 of the Jones plug 39, and the conductor 40.

As will become more fully apparent hereafter, the winding of the normally closed relay 70 is responsive to changes in amplitude of the current at the transistor output terminal 48 and is connected across the output terminals 85 and 86 of a full wave, bridge-type rectifier 87. One of the input terminals 88 of this rectifier is connected to the positive conductor 81 by a lead 89, while the other rectifier input terminal 90 is connected through a blocking condenser 91 to the terminal 48.

The printing wheel 26 (FIGURE 4) and the elongated platen 28 are driven by a single phase, condenser induction motor 95 which is supplied with alternating current from a generator 96 (FIGURE 1). One side of the generator 96 is connected through a switch 99, a conductor 100 and a condenser 101 to the terminals 1 of the Jones plug 39 and from these Jones plug terminals to one terminal of the motor 95 through a conductor 102, the terminals 1 of the Jones plug 61 and a conductor 103. The conductor 100 on this side of the generator also is connected to a second terminal of the motor 95 through a conductor 104, the terminals 2 of the Jones plug 39, a branch conductor 105, a conductor 106, the terminals 2 of the Jones plug 61 and a conductor 107.

Figure 4:
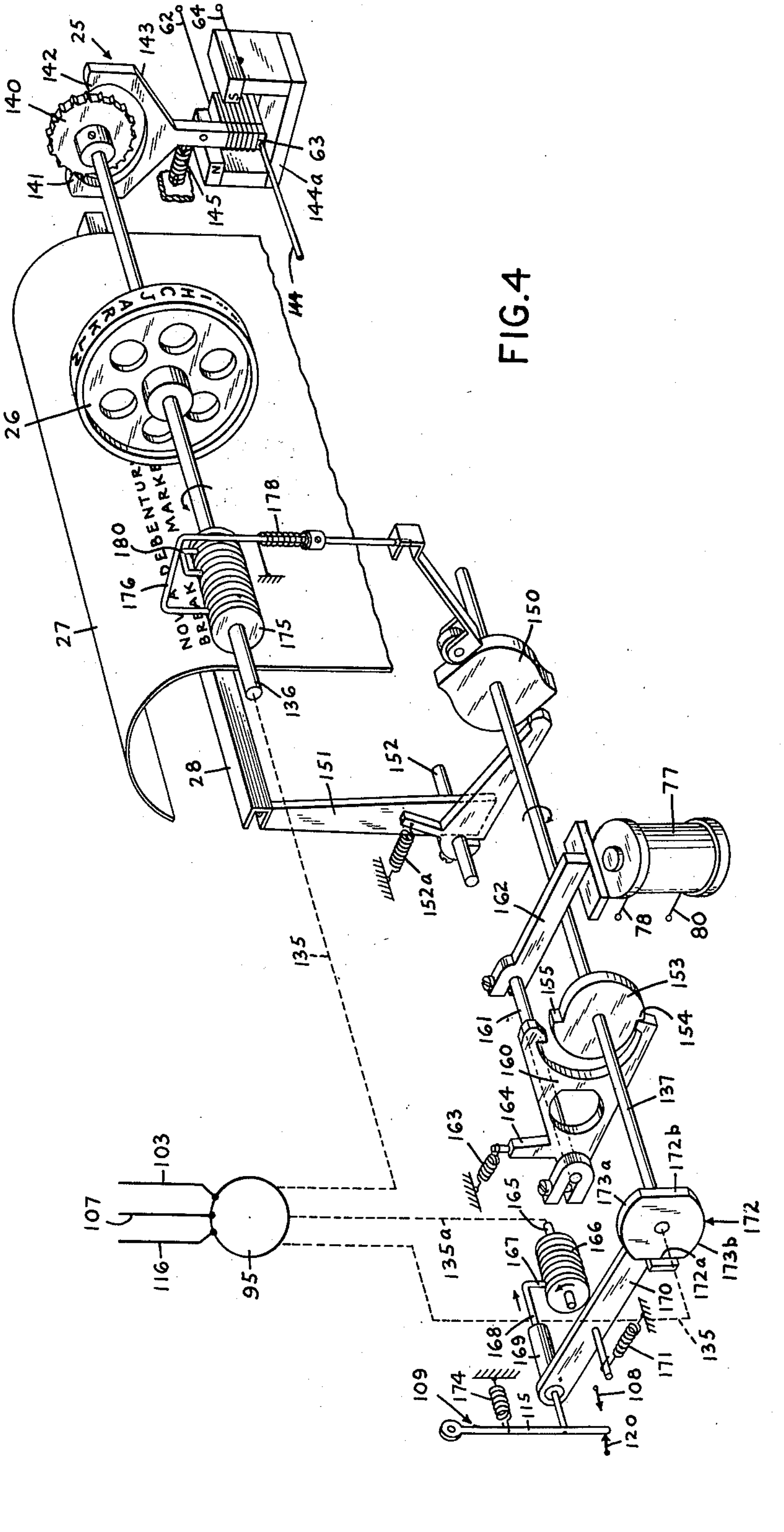
FIGURE 4 is a schematic representation of certain parts of the receiving apparatus controlled by the circuit of FIGURE 1.

The opposite side of the generator 96 is connected to one contact 108 of a transfer switch 109 through a circuit which extends from the generator 96 through a conductor 110, the terminals 3 of the Jones plug 39, conductors 111 and 112, the terminals 3 of the Jones plug 61 and a conductor 113 to the contact 108. The transfer switch 109 includes an armature 115 which is connected to the third terminal of the motor 95 by a conductor 116 and, in the position shown in FIGURES 1 and 4, is spaced from the switch contact 108 and is in engagement with a second switch contact 120. This latter contact is connected to the contact 58 of the time-delay relay 56 by a conductor 121, the terminals 4 of the Jones plug 61 and a conductor 122. The armature 57 of the relay 56 leads to the generator 96 through the conductor 111, the terminals 3 of the Jones plug 39, and the conductor 110.

The contact 58 of the time-delay relay 56 also is connected through a conductor 125 to a terminal 126 and from this terminal to one side of a bell solenoid 128 by a conductor 129. The circuit for the bell solenoid may then be traced from the opposite side thereof, through a conductor 130 and a terminal 131 to the cathode of a diode rectifier 132, the anode of which is connected through the conductors 106, 105, 104 and 100 to the generator 96.

As indicated schematically in FIGURE 4 by dotted lines 135, the alternating current motor 95 is connected through a suitable gear and slip clutch arrangement (not shown) to a character selecting shaft 136 and a substantially parallel printing platen operating shaft 137. The motor tends to rotate the shaft 136 in a counterclockwise direction and the shaft 137 in a clockwise direction, as viewed in FIGURE 4. The shaft 136 carries the printing wheel 26 intermediate its ends and also is provided with a toothed wheel 140 at the end thereof remote from the motor 95. The wheel 140 forms a part of the character selection escapement mechanism 25 and has the usual nineteen teeth, one for every two characters on the printing wheel. These teeth are alternately engaged by two escapement pallets 141 and 142 on the branching arms of a substantially Y-shaped member 143 which is carried by a rock shaft 144. The depending portion of the member 143 serves as the armature for an escapement magnet which comprises the escapement solenoid 63 wound around the armature and a substantially U-shaped, permanent magnet 144*a* having oppositely disposed north and south pole pieces N and S. A biasing compression spring 145 is secured to the member 143 on that side of the shaft 144 at which the branching arms are disposed and tends to urge the member 143 in a clockwise direction to hold the pallet 141 in engagement with the toothed wheel 140. Upon energization of the escapement solenoid 63, the member 143 rocks in a counterclockwise direction about the shaft 144 to bring the pallet 142 into engagement with the toothed wheel.

The shaft 137 is provided with a cam 150 which engages one leg of a bell crank 151 and rocks the latter during each half-revolution of the shaft. The bell crank 151 is carried at its apex by a rock shaft 152 and is suitably biased in a counterclockwise direction, as by a spring 152*a*. The other leg of the bell crank is rigidly affixed to the platen 28. Shaft 137 also is provided with a cam 153 which is spaced from the cam 150 and includes a pair of oppositely disposed lugs 154 and 155 thereon which provide shoulders that are adapted to be engaged by the pallets of a detent member 160. The member 160 is supported at one end of a rock shaft 161, the opposite end of which is affixed to an armature 162 for the printing solenoid 77. The member 160 and the armature 162 are spring biased in a counterclockwise direction by a spring 163 affixed to an extension 164 on member 160. When the solenoid 77 is in its deenergized condition (as shown), the spring 163 holds the armature 162 away from the solenoid and maintains the lowermost pallet on the member 160 in engagement with one of the lugs 154 or 155 to prevent rotation of the shaft 137.

A stub shaft 165 is connected to the motor 95, as shown schematically in FIGURE 4 by a dotted line 135*a*, and is constantly rotated thereby in a counterclockwise direction, as viewed in this figure. The shaft 165 carries a worm 166 having a helical groove which, in the position shown, accommodates a worm follower 167. The follower 167 is carried at one end of an elongated rod 168 which extends in a direction parallel to the shaft 165 and is supported within a cylindircal member 169. In the position shown, the opposite end of the rod 168 engages the armature 115 of the transfer switch 109 to hold the armature in contact with the switch contact 120. The cylindrical member 169 is welded or otherwise rigidly affixed adjacent one end of an elongated, substantially flat cam follower 170. The follower 170 extends in a direction perpendicular to the axis of member 169, and its other end is urged by a biasing spring 171 into engagement with a cam 172 which is cut away to form two oppositely disposed flat portions 172*a* and 172*b*. The cam 172 is positioned on the cam shaft 137 such that, during the time the shaft is at rest (as shown in FIGURE 4), the cam follower 170 is held in contact with one of the flat portions 172*a* or 172*b*, to maintain the worm follower 167 in engagement with the helical groove of the worm 166. For each one-half revolution of the shaft 137, however, the cam follower moves onto one of the oppositely disposed, arcuate portions 173*a* or 173*b* of cam 172, thus disengaging the worm follower from the groove.

A biasing spring 174 urges the armature 115 of the transfer switch 109 toward the right, as viewed in FIGURE 4, while the elongated rod 168 and attached worm follower 167 similarly are urged in this direction by a compression spring (not visible in FIGURE 4) mounted within the cylindrical member 169. However, during the time the follower 167 is in engagement with one of the flat portions 172*a* or 172*b* of the cam 172, the follower is held against the spring tension by the groove in the worm 166, and the rotation of the worm serves to shift the rod 168 toward, and at times into engagement with, the armature 115 and to move this armature against the tension in the spring 174 away from the switch contact 108 and into contact with the switch contact 120, for purposes that will become more fully apparent hereafter.

At the start of the operation cycle, the manually operated switches 51 and 99 (FIGURE 1) are closed, and a relatively long current pulse 24 (FIGURE 2) of negative polarity is transmitted to the receiver over the transmission lines 20 and 21. This pulse is transmitted for, say, at least .50 second and, as indicated heretofore, appears at the transistor output terminal 48 as a positively directed pulse 24′ of equal duration and of relatively high amplitude. The pulse 24′ follows a path from the output terminal 48 and the conductor 55 to the winding of the time-delay relay 56, thereby energizing this relay. Energization of the relay 56 completes a circuit from one side of the generator 96, through the conductor 110, the terminals 3 of the Jones plug 39, the conductor 111, the armature 57 and mating contact 58 of relay 56, the conductor 122, the terminals 4 of the Jones plug 61, the conductor 121, the contact 120 and the armature 115 of the transfer switch 109 and then through the conductor 116 to the alternating current motor 95. The motor 95 is thereby energized and tends to drive the selecting shaft 136 and the worm shaft 165 in a counterclockwise direction, as viewed in FIGURE 4, and the printing shaft 137 in a clockwise direction, as viewed in this figure.

Upon the closing of the manually operated switch 51, the printing solenoid 77 is connected across the battery 41. The circuit for the solenoid 77 extends from the positive terminal of the battery 41, along the conductors 40 and 38 to the transmission line 21 and then to the conductors 81 and 80 leading to one side of the solenoid. The circuit may then be traced from the opposite side of the solenoid, the conductors 78 and 76, the resistor 75, the conductor 74, the armature 71 and the contact 68 for the normally closed relay 70, the conductors 67, 42 and 52 and the switch 51 to the negative terminal of the battery. Energization of the solenoid 77 actuates its armature 162 (FIGURE 4) to rock the shaft 161 and the attached detent member 160 in a clockwise direction against the tension on the spring 163. The detent member thereupon disengages its lower pallet from the lug 154 and carries its upper pallet into the path of this lug, thus permitting the motor 95 to rotate the printing shaft 137 through slightly less than one-half revolution. As the shaft 137 rotates, the cam follower 170 rides onto arcuate portion 173*a* of the cam 172 to thereby move the worm follower 167 away from the worm 166. The elongated rod 168 is thereupon urged to the right, as viewed in FIGURE 4, by its biasing spring, thus enabling movement of the armature 115 for the transfer switch 109 away from the switch contact 120 and into engagement with the switch contact 108 under the action of the spring 174. As a result, the conductor 116 for the motor 95 is directly connected to the generator 96 (FIGURE 1) through the transfer switch armature 115, the contact 108 and the conductors 113, 112, 111 and 110.

As has been described above, the selection of a particular character to be printed by the printing wheel 26 is initiated by the transmission of a series of relatively short current pulses 22 of positive polarity over the transmission lines 20 and 21. These pulses appear at the transistor output terminal 48 as the current pulses 22', and while the amplitude and duration of the pulses 22' are insufficient to operate the time-delay relay 56, they serve to alternately energize and deenergize the escapement solenoid 63. The circuit path for the pulses 22' extends from the terminal 48, the conductor 55, the winding of relay 56, the conductors 60 and 62, through the solenoid 63, and then along the conductors 64, 65 and 67 to the negative lead 42. The solenoid 63 is thus alternately energized and deenergized to oscillate the escapement member 143 (FIGURE 4) about the shaft 144 so that the pallets 141 and 142 alternately engage and disengage the teeth on the wheel 140. The shaft 136, and hence the printing wheel 26, are thereby permitted to rotate step by step under the control of the motor 95 as long as the member 143 continues to oscillate.

During the rotation of the printing wheel 26, the changes in amplitude of the signals 22' at the output terminal 48 (FIGURE 1) are transmitted through the blocking condenser 91 to the rectifier 87 and from this rectifier to the normally closed relay 70. The relay 70 is thereby operated to open the printing solenoid circuit between the relay armature 71 and the contact 68, thus deenergizing the printing solenoid 77. The solenoid 77 releases its armature 162 and remains deenergized as long as the pulses 22' continue to operate the escapement mechanism 25 to permit rotation of the printing wheel 26. With this arrangement, the printing mechanism is rendered ineffective during the operation of the escapement mechanism 25. Upon the release of the solenoid 77, its armature 162 and the detent member 160 are quickly returned by the spring 163 to their initial positions, thereby disengaging the upper pallet of the detent member from the cam lug 154 to permit the shaft 137 to rotate through a small angle until the lug 155 engages the lower pallet of the detent.

As the lug 155 on the cam 153 engages the lower pallet of the detent member 160, the spring 171 moves the cam follower 170 onto the flat portion 172*b* of the cam 172 and returns the worm follower 167 to its position in the groove on the worm 166. The worm thereupon begins to urge the follower 167 and the rod 168 toward the armature 115 of the transfer switch 109.

After the number of character signals 22 necessary to permit rotation of the printing wheel 26 to the selected character have come over the transmission lines 20 and 21, one of the printing signals 23 is sent over the transmission lines to actuate the printing mechanism. As described above, these printing signals comprise periods of either positive current or zero current and appear at the output terminal 48 as periods of zero current or amplified positive current, respectively. In either case, current is prevented from reaching the rectifier 87, and hence the normally closed relay 70, by the blocking condenser 91. The relay 70 is thus maintained in its deenergized condition, and the relay armature 71 is held against the contact 68 to connect the printing solenoid 77 across the battery 41. Upon energization of the solenoid 77, the armature 162 and the attached detent member 160 pivot about the axis of the rock shaft 161, thereby permitting the motor 95 to rotate the printing shaft 137 through slightly less than a half revolution. As the shaft 137 rotates, one of the projections on the cam 150 thereon engages the bell crank 151 to cause the attached platen 28 to push the paper 27 against the wheel 26 and thereby print the selected character. The platen and bell crank are returned to their initial positions (the positions shown) by the spring 152*a*.

During the transmission of the character selecting signals 22, the printing shaft 137 is prevented from rotating by the detent member 160, and the follower 167 is held by the spring 171 in engagement with the helical groove on the worm 166. As the worm rotates, it drives the follower 167 and the attached arm 168 toward the armature 115 of the transfer switch 109. Under normal operating conditions, the duration of each series of character signals is sufficiently short so as to enable the succeeding printing signal 23 to initiate the deenergization of the relay 70, and hence the energization of the solenoid 77, prior to the time the rod 168 engages the armature 115. The solenoid armature 162 thereupon rocks the detent member 160 to permit rotation of the shaft 137 and the cam 172. As this cam rotates, the follower 170 moves onto one of the arcuate cam portions 173*a* or 173*b*, thereby withdrawing the follower 167 from the worm groove and enabling the return of the follower to its initial, right hand position.

In cases in which it is desired to automatically arrest the operation of the receiver, however, signals in general similar to the character signals 22 are repeatedly transmitted thereto for a relatively long period of time, say, several minutes. The received signals appear at the transistor output terminal 48 as a long series of amplified positive current pulses which follow a path from the terminal 48, through the condenser 91 and the rectifier 87 to the relay 70. This relay is thereby energized to hold the circuit for the printing solenoid 77 open for a length of time sufficient to permit the constantly rotating worm 166 (FIGURE 4) to move the follower 167 to a position (the position shown) adjacent the end of the worm closest to the transfer switch 109. It will be understood that the worm 166 is of substantial length and only a small end portion is schematically shown in FIGURE 4. During this movement, the rod 168 engages the switch armature 115 to move it out of contact with the contact 108 and into engagement with the contact 120. As a result, the circuit for the motor 95 is broken between the conductors 113 and 116, and the printing operation is arrested.

In situations in which the printing wheel 26 prints a character other than the intended character, all subsequent characters also will be other than those intended. To remedy this, a series of "unison" signals are sent out at periodic intervals by the transmitter to bring all of the receivers on the line into unison. The unison signals are generally similar to the character signals 22 but are transmitted for a somewhat longer period of time, although their duration is insufficient to shut off the motor 95.

The unison signals oscillate the escapement anchor 143 to permit rotation of the selecting shaft 136 in a manner similar to that described heretofore. As the shaft rotates, a worm 175 thereon also rotates to urge a worm follower 176 toward the right hand end of the worm, as viewed in FIGURE 4. The follower 176 rests on the printing shaft cam 150. During the normal printing operation, this cam rotates intermittently to lift the follower away from the worm, at which time a spring 178 on the follower turns the same to maintain its worm engaging portion adjacent the left end of the worm. When the unison signals are received, however, the printing shaft 137, and hence the cam 150, remain stationary, and the follower engages the worm 175 and is carried to the right until it is engaged by a unison latch 180 on the worm, thus arresting the rotation of the shaft 136 and the printing wheel 26. The arrangement is such that the printing wheels of all the receivers on the line stop at a predetermined point in their rotation, usually when a "space" is presented opposite the printing platen. The transmitter is so arranged that the termination of the unison signals ends on "space," and the printing operation is continued with all of the receivers in unison with the transmitter.

Figure 3:
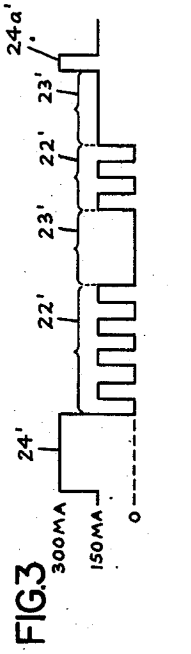
FIGURE 3 illustrates a current wave form corresponding to the wave form shown in FIGURE 2 after it has been modified by the receiver.

During normal operating of the receiver, the selecting shaft 136 and the printing shaft 137 are alternately rotated to effect the alternate selecting and printing of the various characters. However, in some situations, it is advantageous to rotate the printing shaft two or more times in succession without moving the selecting shaft, such as when certain of the characters on the wheel 26 are to be repeated. To repeat one of these characters, the negative signal 24*a* (FIGURE 2) is transmitted to the receiver immediately following the transmission of a printing signal 23 of zero amplitude. As indicated heretofore, upon the receipt of the signal 24*a*, following a zero printing signal, the current at the output terminal 48 of the transistor 30 increases from its intermediate amplitude condition to a relatively high amplitude, as shown in FIGURE 3 by the pulse 24*a'*. The increased current flows through the conductor 55, the time-delay relay 56 and the conductors 60 and 62 to the escapement solenoid 63 and then back to the negative lead 42 through the conductors 64 and 65, the jack 66 and the conductor 67. The escapement solenoid is thereby maintained in its energized condition to prevent rotation of the selecting shaft 136, while the duration of the increased current pulse is insufficient to actuate the relay 56.

As the current at the output terminal 48 increases and then decreases, it sends a pulse of current through the condenser 91 and the rectifier 87 to the normally closed relay 70, thus briefly energizing this relay. The relay armature 71 opens the circuit for the printing solenoid 77 to deenergize the solenoid and permit rotation of the printing shaft 137 through another half revolution, thereby operating the platen 28 to urge the paper 27 up against the wheel 26 and again print the selected character. Thereafter, upon the receipt of the succeeding character pulses, the printing shaft 137 is held stationary while the selecting shaft 136 is permitted to rotate in the manner described above to select the next character to be printed.

When it is desired to attract particular attention to the receiver, such as upon the printing of a news item of particular importance, the relatively long negative signal 24 is sent over the transmission lines 20 and 21 and is converted to the positive signal 24' at the transistor output terminal 48. As indicated heretofore, the amplitude and duration of the signal 24' is sufficient to energize the time-delay relay 56. A circuit is thus completed which extends from the conductor 110 on one side of the generator 96, through the terminals 3 of the Jones plug 39, the conductor 111, the relay armature 57 and associated contact 58, the conductors 125 and 129, the bell solenoid 128 and then back through the conductor 130, the diode 132, the conductors 106 and 105, the Jones plug terminals 2 and the conductors 104 and 100 to the other side of the generator 96. Upon the completion of this circuit, the solenoid 128 is energized to ring the bell.

The terms and expressions which have been employed are used as terms of description and not of limitation, and there is no intention in the use of such terms and expressions, of excluding any equivalents of the features shown and described, or portions thereof, it being recognized that various modifications are possible within the scope of the invention claimed.

What is claimed is:

1. In an apparatus for receiving positive, negative and open printing telegraph signals of varying duration over a transmission line and for controlling a telegraphic printer in accordance with the signals received, in combination, translating means including an electron discharge device having an input terminal connected to said transmission line and an output terminal, said translating means producing zero currents, positive currents of comparatively high amplitude and positive currents of intermediate amplitude at said output terminal in response to the receipt of said positive, negative and open signals, respectively, at said input terminal, a character selecting mechanism, first circuit means for maintaining said output terminal in operative relationship with said selecting mechanism, to operate said selecting mechanism in response to the appearance of alternate zero and intermediate amplitude currents of a given duration at said output terminal, a printing mechanism for forming printed impressions of selected characters, second circuit means connected between said output terminal and said printing mechanism for operating the same in response to the appearance of either zero or intermediate amplitude currents of a different duration at said output terminal, a motor connected to said selecting and printing mechanisms, and a starting circuit for said motor including means connected in series with said first circuit means and operable solely in response to the appearance of said comparatively high amplitude currents at said output terminal to initiate operation of said motor.

2. In an apparatus for receiving positive, negative and open printing telegraph signals of varying duration over a transmission line, and for controlling a telegraphic printer in accordance with the signals received, in combination, translating means including an electron discharge device having an input terminal connected to said transmission line and an output terminal, said translating means producing zero currents, positive currents, of comparatively high amplitude and positive currents of intermediate amplitude at said output terminal in response to the receipt of said positive, negative and open signals, respectively, at said input terminal, a character selecting mechanism, first circuit means for maintaining said output terminal in direct, electrically conductive relationship with said selecting mechanism, to operate said selecting mechanism in response to the appearance of alternate zero and intermediate amplitude currents of relatively short duration at said output terminal, a printing mechanism for forming printed impressions of selected characters, second circuit means connected between said output terminal and said printing mechanism for operating the same in response to the appearance of either zero or intermediate amplitude currents of relatively long duration at said output terminal, an alternating current motor connected to said selecting and printing mechanisms, and a starting circuit for said motor including relay means connected in series with said first circuit means and operable solely in response to the appearance of compartively high amplitude currents of relatively long duration at said output terminal to initiate operation of said motor.

3. In an apparatus for receiving positive, negative and open printing telegraph signals of varying duration over a transmission line and for controlling a telegraphic printer in accordance with the signals received, in combination, translating means including an electron discharge device having an input terminal connected to said transmission line and an output terminal, said translating means producing zero currents, positive currents of comparatively high amplitude and positive currents of intermediate amplitude at said output terminal in response to the receipt of said positive, negative and open signals, respectively, at said input terminal, a character selecting mechanism, first circuit means for maintaining said output terminal in electrically conductive relationship with said selecting mechanism, to operate said selecting mechanism in response to the appearance of alternate zero and intermediate amplitude currents of a given duration at said output terminal, a printing mechanism for forming printed impressions of selected characters, second circuit means interposed between said output terminal and said printing mechanism for operating the same in response to the appearance of either zero or intermediate amplitude currents of a different duration at said output terminal, said second circuit means including means responsive to alternate zero and intermediate amplitude currents of said given duration for rendering said printing mechanism ineffective during operation of said selecting mechanism, a motor connected to said selecting and printing mechanisms, and a starting circuit for said motor including means connected to said output terminal and operable solely in response to the appearance of said comparatively high amplitude currents thereat for initiating operation of said motor.

4. In an apparatus for receiving positive, negative and open printing telegraph signals of varying duration over a transmission line and for controlling a telegraphic printer in accordance with the signals received, in combination, translating means including a transistor having an input terminal connected to said transmission line and an output terminal, said translating means producing zero currents, positive currents of comparatively high amplitude and positive currents of intermediate amplitude at said output terminal in response to the receipt of said positive, negative and open signals, respectively, at said input terminal, a character selecting mechanism, first circuit means for maintaining said output terminal in electrically conductive relationship with said selecting mechanism, to operate said selecting mechanism in response to the appearance of alternate zero and intermediate amplitude currents of relatively short duration at said output terminal, a printing mechanism including a print solenoid for forming printed impressions of selected characters, second circuit means connected between said output terminal and said printing mechanism for operating said print solenoid in response to the appearance of either zero or intermediate amplitude currents of a relatively long duration at said output terminal, said second circuit means including a condenser connected to said output terminal and a normally closed relay having a winding in series with said condenser and a contact pair in series with said print solenoid, said relay being responsive only to alternate zero and intermediate amplitude currents of said relatively short duration to maintain said print solenoid in its deenergized condition and thereby render said printing mechanism ineffective during operation of said selecting mechanism, an alternating current motor connected to said selecting and printing mechanisms, and a starting circuit for said motor including a circuit controlling element connected in series with said first circuit means and operable solely in response to the appearance of comparatively high amplitude currents of relatively long duration at said output terminal to initiate operation of said motor.

5. In an apparatus for receiving positive, negative and open printing telegraph signals of varying duration over a transmission line and for controlling a telegraphic printer in accordance with the signals received, in combination, translating means including a transistor having an input terminal connected to said transmission line and an output terminal, said translating means producing zero currents, positive currents of comparatively high amplitude and positive currents of intermediate amplitude at said output terminal in response to the receipt of said positive, negative and open signals, respectively, at said input terminal, a character selecting mechanism, first circuit means, including a circuit controlling element interconnected between said output terminal and said selecting mechanism, for operating said selecting mechanism in response to the appearance of alternate zero and intermediate amplitude currents of relatively short duration at said output terminal, said circuit controlling element being operable solely in response to the appearance of comparatively high amplitude currents of relatively long duration at said output terminal, a printing mechanism for forming printed impressions of selected characters, said printing mechanism including a print solenoid having a single winding thereon, second circuit means connected between said output terminal and said printing mechanism for energizing said winding only in response to the appearance of either zero or intermediate amplitude currents of relatively long duration at said output terminal, said second circuit means including a normally closed relay responsive to alternate zero and intermediate amplitude currents of said relatively short duration to render said printing mechanism ineffective during operation of said selecting mechanism, an alternating current motor connected to said selecting and printing mechanisms, a starting circuit for said motor, and a bell ringing circuit, said starting circuit and said bell ringing circuit each being controlled by said circuit controlling element, whereby said motor and bell are operable solely in response to the appearance of said relatively long, comparatively high amplitude currents at said output terminal.

6. An apparatus of the character set forth in claim 5, in which said printing mechanism includes a cam shaft rotatable by said motor upon the appearance of said zero or intermediate amplitude currents of relatively long duration at said output terminal, a cam on said shaft, and means controlled by said cam and in operative relationship with the starting circuit for said motor for continuing operation thereof upon the termination of said relatively long, comparatively high amplitude currents at said output terminal.

References Cited in the file of this patent

UNITED STATES PATENTS

| | | |
|---|---|---|
| 1,957,076 | Paulding | May 1, 1934 |
| 2,531,868 | Ackell et al. | Nov. 28, 1950 |